US009783684B2

(12) United States Patent
Yamaguchi et al.

(10) Patent No.: US 9,783,684 B2
(45) Date of Patent: Oct. 10, 2017

(54) ACTIVE ENERGY RAY-CURABLE COATING VARNISH, AND PRINTED MATTER USING SAME

(71) Applicants: TOYO INK SC HOLDINGS CO., LTD., Tokyo (JP); TOYO INK CO., LTD., Tokyo (JP)

(72) Inventors: Seiji Yamaguchi, Tokyo (JP); Shinsuke Tsurutani, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 0 days.

(21) Appl. No.: 15/313,969

(22) PCT Filed: May 25, 2015

(86) PCT No.: PCT/JP2015/064930
§ 371 (c)(1),
(2) Date: Nov. 25, 2016

(87) PCT Pub. No.: WO2015/182555
PCT Pub. Date: Dec. 3, 2015

(65) Prior Publication Data
US 2017/0145220 A1    May 25, 2017

(30) Foreign Application Priority Data

May 26, 2014 (JP) ................................. 2014-108241

(51) Int. Cl.
| C09D 4/00 | (2006.01) |
| C09D 5/00 | (2006.01) |
| B65D 65/42 | (2006.01) |
| B65D 65/38 | (2006.01) |
| C09D 11/101 | (2014.01) |

(52) U.S. Cl.
CPC ............. *C09D 4/00* (2013.01); *B65D 65/38* (2013.01); *B65D 65/42* (2013.01); *C09D 5/00* (2013.01); *C09D 11/101* (2013.01)

(58) Field of Classification Search
CPC .............................. B65D 65/38; C09D 11/101
See application file for complete search history.

(56) References Cited

U.S. PATENT DOCUMENTS

| 2006/0115669 A1* | 6/2006 | Shinohara | B32B 27/08 428/524 |
| 2009/0098304 A1 | 4/2009 | Stone et al. | |
| 2010/0134726 A1 | 6/2010 | Morishima et al. | |
| 2010/0304098 A1* | 12/2010 | Ohno | C09D 11/101 428/195.1 |
| 2014/0275319 A1* | 9/2014 | Yamada | C09D 11/101 522/99 |
| 2014/0349129 A1* | 11/2014 | Izumi | C08F 2/38 428/463 |

FOREIGN PATENT DOCUMENTS

| JP | 2001-316416 | 11/2001 |
| JP | 2002-161106 | 6/2002 |
| JP | 2005-154748 | 6/2005 |
| JP | 2007-191606 | 8/2007 |
| JP | 2007-204543 | 8/2007 |
| JP | 2008-545859 | 12/2008 |
| JP | 2010-085015 | 4/2010 |
| JP | 2010-150513 | 7/2010 |
| JP | 2010-280774 | 12/2010 |
| JP | 2012-188660 | 10/2012 |
| JP | 2013-023549 | 2/2013 |
| JP | 5286859 | 9/2013 |
| JP | 2013-211173 | 10/2013 |
| JP | 2014-046010 | 3/2014 |
| JP | 2014-046617 | 3/2014 |
| JP | 2014-047300 | 3/2014 |
| JP | 2014-065787 | 4/2014 |
| JP | 2014-089405 | 5/2014 |
| JP | 5673881 | 2/2015 |

OTHER PUBLICATIONS

"Office Action of Japan Counterpart Application", with English translation thereof, issued on Aug. 26, 2014, pp. 1-7.
"International Preliminary Report on Patentability; this report contains the following items :Form PCT/IB/338, PCT/IB/373, PCT/ISA237(cover sheet), PCT/ISA237(Box No. I),PCT/ISA237(Box No. V)", mailed on Dec. 8, 2016, which is English translation of "Written Opinion of the International Searching Authority", pp. 1-7.
"International Search Report (Form PCT/ISA/210)", mailed on Aug. 18, 2015, with English translation thereof, pp. 1-5.

\* cited by examiner

*Primary Examiner* — Betelhem Shewareged
(74) *Attorney, Agent, or Firm* — Jianq Chyun IP Office

(57) ABSTRACT

Shown is an active energy ray-curable coating varnish which is capable of suppressing outward migration from printed matter, and which is capable of simultaneously achieving excellent curability and excellent line applicability, in addition to low yellowing characteristics. The coating varnish contains a (meth)acrylate compound (A) and a photopolymerization initiator (B), wherein at least one compound selected from the group consisting of ethylene oxide-modified pentaerythritol tetraacrylates, ethylene oxide-modified diglycerol tetraacrylates, ethylene oxide-modified trimethylolpropane triacrylates and ethylene oxide-modified ditrimethylolpropane tetraacrylates is used as the (meth)acrylate compound (A), and at least one of 2-hydroxy-1-[4-[4-(2-hydroxy-2-methyl-propionyl)-benzyl]-phenyl]-2-methyl-propan-1-one (b1) and oligo[2-hydroxy-2-methyl-1-[4-(1-methylvinyl)phenyl]propanone] (b2) is used as the photopolymerization initiator (B).

4 Claims, No Drawings

ACTIVE ENERGY RAY-CURABLE COATING VARNISH, AND PRINTED MATTER USING SAME

CROSS-REFERENCE TO RELATED APPLICATION

This application is a 371 application of the international PCT application serial no. PCT/JP2015/064930, filed on May 25, 2015, which claims the priority benefit of Japan application no. 2014-108241, filed on May 26, 2014. The entirety of each of the above-mentioned patent applications is hereby incorporated by reference herein and made a part of this specification.

TECHNICAL FIELD

The present invention relates to an active energy ray-curable coating varnish, and a printed matter obtained by printing the varnish. In particular, the present invention relates to an active energy ray-curable coating varnish in which outward migration from the printed matter of both the (meth)acrylate monomer and the photopolymerization initiator that represent the main components of the coating varnish can be suppressed, whereby the coating varnish can be used favorably as a packaging material for foodstuffs and pharmaceuticals. Moreover, the present invention relates to an active energy ray-curable coating varnish which, in addition to the low yellowing characteristics required of a coating varnish, is able to achieve a particularly superior combination of excellent curability and favorable line applicability due to imparting the printed matter with an antistatic effect.

BACKGROUND ART

A variety of printing methods such as lithographic printing (including normal lithography which uses a dampening solution and waterless lithography which uses no dampening solution), relief printing, intaglio printing and stencil printing have conventionally been used to obtain all manner of printed matter, including printed items on cardboard and various types of books, printed packaging materials such as business form printed items, various plastic printed items, printed items for stickers and labels, and metal printed items. In order to produce this printed matter, inks best suited to each of these printing methods are used. Particularly in the production of cartons typified by cardboard items, various types of printed books, and printed items for stickers and labels, a coating varnish is frequently applied following printing of the ink for purposes including improving the quality of the printed matter and protecting the printed design.

Known examples of such coating varnishes include active energy ray-curable coating varnishes. An active energy ray-curable coating varnish contains an unsaturated compound such as an acrylate ester compound that exhibits curability upon irradiation with active energy rays as a structural component. This type of coating varnish cures instantaneously upon irradiation with active energy rays, with a three dimensional crosslinking reaction of the above unsaturated compound forming a tough coating film. Further, because of this favorable curability, post processing of the coating varnish can be performed immediately following printing. As a result, active energy ray-curable coating varnishes tend to be used widely in the field of printing for packaging, which requires good rub resistance in order to improve productivity and protect the design aesthetics.

In the aforementioned field of printing for packaging, printed matter for foodstuff packaging represents a large proportion of such printed matter. In this particular field, in addition to improvements in the print quality relating to the design aesthetics of the packaging, recent enhanced awareness of safety issues has resulted in a tendency for increased discussion relating to the migration of raw materials from the coating composition into the food contents. This tendency for increased discussion of the migration of coating composition raw materials has naturally tended to be more pronounced in the European and American markets where safety awareness has generally been at a higher level. Switzerland has recently enacted the world's first legal regulation relating to printing inks or coating varnishes for foodstuff packaging (Swiss Ordinance (RS817.023.21), and the effect of this ordinance has spread widely, not only throughout the whole of Europe, but also within other developed nations such as Japan, and other developing nations.

In this ordinance, substances having a certain degree of toxicity or for which concern has been reported in relation to environmental hormones are prohibited for use as raw materials in coating compositions such as printing inks and coating varnishes. Further, the amount of migration permitted into the food contents of the various raw materials used as coating composition raw materials is also strictly limited. The amounts of permitted migration are extremely small, in the order of ppb, making the design of inks extremely demanding. Moreover, large foodstuff manufacturers and foodstuff packaging manufacturers across the entire global market have now started adopting regulations of a similar standard to Swiss Ordinance (RS817.023.21) as their own internal regulations.

In this manner, superior low migration characteristics are now being demanded across the board of raw materials for coating compositions used in foodstuff packaging. In the case of coating varnishes, because the thickness of the coating film on the printed matter is greater than that of an ink, and because the varnish is often used for forming the outermost surface layer on the printed matter, it could be said that the risks associated with outward migration of the raw materials from the coating varnish are particularly large.

As typified by the technology in Patent Documents 1, 2 and 3, research is being conducted from various viewpoints with the aim of achieving low migration, low odor or low bleeding characteristics. Patent Document 1 discloses a method in which by performing chemical bonding between a photopolymerization initiator or a sensitizer and a polyester resin, migration, elution or evaporation of the photopolymerization initiator or the sensitizer following the curing reaction can be reduced. Patent Document 2 discloses a method for reducing odor and migration by appropriate selection of the photopolymerization initiator or sensitizer in an active energy ray-curable ink. Patent Document 3 discloses a method of achieving a combination of superior curability and low bleeding characteristics by using a novel photopolymerization initiator based on a thioxanthone backbone as a sensitizer.

However, the test conditions relating to the evaluations of the low migration characteristics, low odor and low bleeding characteristics are analyzed as below. In Patent Document 1, a film substrate is placed on the printed item, compression is performed at a temperature of 70° C. and a pressure of 100 kgf/cm$^2$ for 5 hours, and the amounts of unreacted initiator and sensitizer that have migrated into the film are measured using a UV-VIS absorption spectrophotometer. Similarly, in Patent Document 2, a film substrate is placed on the printed item, and following standing for 24 hours at a temperature of 60° C. under a pressure of 100 kg/cm², the film is then immersed in distilled water (temperature: 25° C., 24 hours), and the amounts of unreacted initiator and sensitizer, and unreacted monomers or oligomers, contained within the distilled water are measured using a UV-VIS absorption spectrophotometer. Further, in Patent Document 3, an unprinted white sheet of paper is placed on the printed item, and following standing for 24 hours at a temperature of 60° C. under a pressure of 15 g/cm², the amounts of the initiator and sensitizer that have migrated onto the white paper are measured.

As described above, Patent Documents 1 and 3 use measurements of the ultraviolet absorption spectrum on a film or sheet of paper, and therefore quantitative measurements at the ppb order are difficult. Moreover, in relation to the measurements in Patent Document 3, the compression conditions and the standing time are comparatively slight. The methods disclosed in Patent Documents 1 and 3 relate mainly to reducing the migration of the photopolymerization initiator and the sensitizer, and make no mention of reducing the migration of the radical polymerizable monomer or oligomer, which is the other main component in the crosslinking reaction.

Further, in Patent Document 2, the film into which migration of the ink raw materials from the printed item is assumed to have occurred is extracted using distilled water. However, in most regulations including Swiss Ordinance (RS817.023.21), the use of a high-concentration alcohol aqueous solution is deemed the most suitable for replicating the actual contents of foodstuff packaging. Furthermore, the temperature and standing time conditions used cannot be said to fully satisfy market demands. In addition, the majority of radical polymerizable monomers or oligomers used in active energy ray-curable inks lack a light absorption wavelength, meaning detection of these compounds using the type of UV-VIS absorption spectrophotometer described in Patent Document 2 is impossible.

In this manner, as enhanced awareness of safety issues relating to foodstuff and pharmaceutical packaging spreads around the world, there are growing demands for active energy ray-curable ink compositions and coating varnishes that satisfy the standards of regulations typified by Swiss Ordinance (RS817.023.21). However, when production of actual products and storage conditions thereof, and further the establishment of appropriate product test conditions were considered, the above regulations are yet to be not satisfied.

Increasing the molecular weight of coating composition raw material compounds is a widely used technique for achieving low migration, low odor and low bleeding characteristics for the raw materials. However, in those cases where a (meth)acrylate monomer is used as the main raw material of an ink or a coating varnish, because increasing the molecular weight of the compound is accompanied by an increase in the molecular weight per (meth)acrylic equivalent in the molecule, the polymerization reactivity tends to deteriorate. On the other hand, with regards the (meth) acrylate monomer within an active energy ray-curable ink or coating varnish, increasing the number of (meth)acrylic groups can improve the curability. However, if the cross-linking density upon curing is too large, then a problem arises in that the cracking resistance of the coating film tends to deteriorate. Further, if an active energy ray-curable coating varnish is used to form the outermost layer on a printed item, then from the viewpoints of enabling the execution of post processing steps following printing of the package, such as die cutting, line marking and foil stamping, it is important that the coating film of the coating varnish exhibits appropriate slipperiness for use in a mechanical line (line applicability).

Accordingly, in the field of printed matter for foodstuff packaging, it is necessary to achieve a combination of meeting the safety standards demanded by the market environment, by suppressing the migration of the coating composition raw materials into the food contents, and improving the production efficiency of the printed matter, by ensuring superior curability and imparting antistatic properties.

PRIOR ART DOCUMENTS

Patent Documents

Patent Document 1: JP 2005-154748 A
Patent Document 2: JP 2007-204543 A
Patent Document 3: JP 5,286,859 B

DISCLOSURE OF INVENTION

Problems Invention Aims to Solve

The present invention provides an active energy ray-curable coating varnish that is capable of suppressing outward migration from the printed matter of both the (meth) acrylate compound and the photopolymerization initiator which represent the main components of the coating varnish. The invention further provides an active energy ray-curable coating varnish which, in addition to the low yellowing characteristics required of a coating varnish, is able to achieve a particularly superior combination of excellent curability and favorable line applicability due to imparting the printed matter with an antistatic effect.

Means for Solution of the Problems

The inventors of the present invention undertook intensive research of active energy ray-curable coating varnishes containing an unsaturated compound such as an acrylate ester compound, which exhibit curability upon irradiation with active energy rays. As a result, they discovered that in a coating varnish containing a (meth)acrylate compound and a photopolymerization initiator as the main components, by using specific compounds, the various desired characteristics could be achieved, and they were thus able to complete the present invention.

In other words, one aspect of the present invention relates to an active energy ray-curable coating varnish containing a (meth)acrylate compound (A) and a photopolymerization initiator (B), and having the characteristic features (1) to (6) described below.

(1) The (meth)acrylate compound (A) has three or more (meth)acrylic groups within a single molecule, and has a weight-average molecular weight within a range from 500 to 2,000.

(2) The (meth)acrylate compound (A) contains an ethylene oxide-modified (meth)acrylate compound (a) having a (meth)acrylic equivalent weight within a range from 120 to 200, and the amount of the ethylene oxide-modified (meth) acrylate compound (a) relative to the total weight of the (meth)acrylate compound (A) is at least 50% by weight.

(3) The ethylene oxide-modified (meth)acrylate compound (a) contains at least one compound selected from the group consisting of ethylene oxide-modified pentaerythritol tetraacrylates, ethylene oxide-modified diglycerol tetraacrylates, ethylene oxide-modified trimethylolpropane triacrylates, and ethylene oxide-modified ditrimethylolpropane tetraacrylates.

(4) The photopolymerization initiator (B) has a weight-average molecular weight within a range from 300 to 2,000.

(5) The amount of the photopolymerization initiator (B), relative to the total weight of the active energy ray-curable coating varnish, is within a range from 0.1 to 15.0% by weight.

(6) The photopolymerization initiator (B) contains at least one of (b1) 2-hydroxy-1-[4-[4-(2-hydroxy-2-methyl-propionyl)-benzyl]-phenyl]-2-methyl-propan-1-one, and (b2) oligo[2-hydroxy-2-methyl-1-[4-(1-methylvinyl)phenyl]propanone].

In one aspect, relative to the total weight of the active energy ray-curable coating varnish, the active energy ray-curable coating varnish contains at least one of 0.01 to 5.0% by weight of the above compound (b1) and 0.01 to 5.0% by weight of the above compound (b2), and the total weight of the photopolymerization initiator (B) is within a range from 1.0 to 15.0% by weight.

Effects of the Invention

In the active energy ray-curable coating varnish according to the present invention, the suppression of outward migration from the printed matter of the (meth)acrylate compound and the photopolymerization initiator which represent the main components of the coating varnish is capable of satisfying the highest standards demanded by the market environment, typified by the regulation standards of Swiss Ordinance (RS817.023.21). As a result, the present invention can provide printed matter that satisfies safety standards which take due account of the increased awareness of safety issues relating to foodstuff and pharmaceutical packaging that continues to spread across the entire global market. Moreover, because the present invention provides excellent low yellowing characteristics, exhibits excellent curability upon irradiation with ultraviolet rays having a wavelength of 200 to 420 nm, and yields favorably line applicability by imparting the printed matter with an antistatic effect, it enables the efficient production of high-quality printed matter.

This Application is related to the subject matter disclosed in prior Japanese Application 2014-108241 filed on May 26, 2014, the entire contents of which are incorporated by reference herein.

EMBODIMENTS FOR CARRYING OUT THE INVENTION

The present invention is described below in further detail. One aspect of the present invention relates to an active energy ray-curable coating varnish.

In the present invention, "active energy" describes the energy necessary to excite the raw material compound(s) in a curing reaction from a ground state to a transition state. Specifically, in the present invention, the term "active energy ray" means ultraviolet rays or an electron beam.

The active energy ray-curable coating varnish according to the present invention is designed so that, following printing, the varnish exhibits excellent curability upon irradiation with active energy rays (specifically, upon ultraviolet irradiation with a high-pressure mercury lamp or metal halide lamp that emits ultraviolet rays of 200 to 420 nm), and so that the printed matter obtained following curing has good antistatic properties.

The active energy ray-curable coating varnish described above (hereafter also sometimes abbreviated as "the coating varnish") can be used favorably as a material for forming printed matter for the packaging of foodstuffs and pharmaceuticals. The coating varnish can be used particularly favorably as the material that constitutes the outermost layer (outer surface layer) of the printed layer formed on the substrate. The coating varnish contains a (meth)acrylate compound and a photopolymerization initiator, wherein the specific compounds detailed below are used as these components. The present invention is able to provide a coating varnish in which the outward migration characteristics of the above components of the coating varnish, namely the concentration levels of the (meth)acrylate compound (A) and the photopolymerization initiator (B) in ethanol, measured in accordance with the measurement conditions described in the following examples, are each less than 100 ppb. In the present invention, the term "(meth)acrylate" includes the meanings of both acrylate and methacrylate.

<(Meth)acrylate Compound>

In the present invention, the (meth)acrylate compound (A) that represents the main component of the coating varnish is preferably a compound which has a specific weight-average molecular weight in order to achieve good suppression of outward migration from the printed matter, and also undergoes a photopolymerization reaction with good efficiency upon ultraviolet irradiation using a high-pressure mercury lamp and/or a metal halide lamp that emits ultraviolet rays of 200 to 420 nm.

More specifically, from the viewpoint of suppressing outward migration, the weight-average molecular weight of the (meth)acrylate compound (A) is preferably at least 500, and from the viewpoint of the curability, the weight-average molecular weight is preferably not more than 2,000. In one embodiment, the weight-average molecular weight of the (meth)acrylate compound (A) is within a range from 500 to 2,000, preferably within a range from 500 to 1,000, and more preferably within a range from 500 to 800. However, the present invention does not exclude the use of other (meth)acrylate compounds having a weight-average molecular weight of less than 500 or more than 2,000. One embodiment of the present invention does not exclude those cases in which this type of other (meth)acrylate compound is included in the coating varnish, either in a detectable amount that is not more than 100 ppb or a trace amount that is not detectable in the migration test described below.

In the present invention, the printed matter obtained by printing the active energy ray-curable coating varnish onto a substrate requires good line applicability, in order to ensure that favorable production efficiency can be achieved in post processing steps such as die cutting. In other words, the coating film surface of the active energy ray-curable coating varnish formed on the printed matter must have antistatic properties.

In one embodiment, for the purpose of imparting the surface of the printed matter with antistatic properties, a (meth)acrylate compound having at least one ethylene oxide adduct per molecule, namely an ethylene oxide-modified (meth)acrylate compound (a), is preferably used as the (meth)acrylate compound (A). The addition of an alkylene oxide to a (meth)acrylate compound for purposes such as reducing skin irritation or altering the viscosity is well known. In particular, the addition of ethylene oxide can increase the polarity of many targeted (meth)acrylate compounds, and addition of at least a prescribed amount of ethylene oxide can also enables the hydrophobic (meth)acrylate compound to be made water-soluble. On the other hand, addition of an alkylene oxide of $C_3$ or greater such as propylene oxide is unable to hydrophilize the (meth)acrylate compound. Moreover, addition of propylene oxide tends to cause a large reduction in the reactivity of the (meth)acrylate compound.

Specific examples of ethylene oxide-modified (meth)acrylate compounds (a) that may be used as the (meth)acrylate compound (A) include ethylene oxide-modified pentaerythritol tetraacrylates, ethylene oxide-modified diglycerol tetraacrylates, ethylene oxide-modified trimethylolpropane triacrylates, and ethylene oxide-modified ditrimethylolpropane tetraacrylates. These compounds may be used individually, or a combination of two or more compounds may be used.

From the viewpoint of curability, the (meth)acrylate compound (A) preferably has three or more (meth)acrylic groups, namely (meth)acrylate functional groups, within a single molecule. Although there are no particular limitations on these types of compounds, specific examples include trimethylolpropane tricaprolactonate tri(meth)acrylate, pentaerythritol tetracaprolactonate tetra(meta)acrylate, ditrimethylolpropane tetra(meth)acrylate, ditrimethylolpropane tetracaprolactonate tetra(meth)acrylate, ditrimethylolethane tetra(meth)acrylate, ditrimethylolbutane tetra(meth)acrylate, ditrimethylolhexane tetra(meth)acrylate, ditrimethyloloctane tetra(meth)acrylate, dipentaerythritol penta(meth)acrylate, dipentaerythritol hexa(meth)acrylate, tripentaerythritol hexa(meth)acrylate, tripentaerythritol hepta(meth)acrylate, and tripentaerythritol octa(meth)acrylate. These compounds may be used individually, or a combination of two or more compounds may be used. Among these, if consideration is given to curability and market versatility, then the selection of at least one compound selected from the group consisting of ditrimethylolpropane tetraacrylate, dipentaerythritol pentaacrylate and dipentaerythritol hexaacrylate is preferable.

Further, alkylene oxide adduct (meth)acrylates of aliphatic alcohol compounds may also be used as the (meth)acrylate compound (A). Specific examples of these compounds include mono or poly (1 to 10) (meth)acrylates of mono or poly (1 to 20) alkylene oxide adducts of aliphatic alcohol compounds. The alkylene oxide may contain a $C_2$ to $C_{20}$ alkylene oxide, and specific examples include ethylene oxide, propylene oxide, butylene oxide, pentylene oxide and hexylene oxide.

Among these alkylene oxide adduct (meth)acrylates, although there are no particular limitations, specific examples of compounds having three or more (meth)acrylic groups per molecule include the following compounds.

Glycerol poly (2 to 20) alkylene ($C_3$ to $C_{20}$) oxide adduct tri(meth)acrylate,
trimethylolpropane poly (2 to 20) alkylene ($C_2$ to $C_{20}$) oxide adduct tri(meth)acrylate,
trimethylolethane poly (2 to 20) alkylene ($C_3$ to $C_{20}$) oxide adduct tri(meth)acrylate,
trimethylolhexane poly (2 to 20) alkylene ($C_2$ to $C_{20}$) oxide adduct tri(meth)acrylate,
trimethyloloctane poly (2 to 20) alkylene ($C_2$ to $C_{20}$) oxide adduct tri(meth)acrylate,
pentaerythritol poly (2 to 20) alkylene ($C_2$ to $C_{20}$) oxide adduct tri(meth)acrylate,
pentaerythritol poly (2 to 20) alkylene ($C_2$ to $C_{20}$) oxide adduct tetra(meth)acrylate,
ditrimethylolpropane poly (2 to 20) alkylene ($C_2$ to $C_{20}$) oxide adduct tetra(meth)acrylate,
ditrimethylolethane poly (2 to 20) alkylene ($C_2$ to $C_{20}$) oxide adduct tetra(meth)acrylate,
ditrimethylolbutane poly (2 to 20) alkylene ($C_2$ to $C_{20}$) oxide adduct tetra(meth)acrylate,
ditrimethylolhexane poly (2 to 20) alkylene ($C_2$ to $C_{20}$) oxide adduct tetra(meth)acrylate,
ditrimethyloloctane poly (2 to 20) alkylene ($C_2$ to $C_{20}$) oxide adduct tetra(meth)acrylate,
dipentaerythritol poly (2 to 20) alkylene ($C_2$ to $C_{20}$) oxide adduct penta(meth)acrylate,
dipentaerythritol poly (2 to 20) alkylene ($C_2$ to $C_{20}$) oxide adduct hexa(meth)acrylate,
tripentaerythritol poly (2 to 20) alkylene ($C_2$ to $C_{20}$) oxide adduct hexa(meth)acrylate,
tripentaerythritol poly (2 to 20) alkylene ($C_2$ to $C_{20}$) oxide adduct hepta(meth)acrylate, and
tripentaerythritol poly (2 to 20) alkylene ($C_2$ to $C_{20}$) oxide adduct octa(meth)acrylate.

In the present invention, the (meth)acrylate compound (A) preferably contains a (meth)acrylate compound (a) for which the (meth)acrylic equivalent weight is within a range from 120 to 200. The "(meth)acrylic equivalent weight" means the value of [molecular weight of (meth)acrylate compound (A)/number of (meth)acrylic groups contained in one molecule]. Relative to the total weight of the (meth)acrylate compound (A), the amount of the above (meth)acrylate compound (a) is preferably at least 50% by weight. In one embodiment, this amount is preferably within a range from 60 to 100% by weight, and more preferably within a range from 70 to 100% by weight.

When the amount of the (meth)acrylate compound (a) is adjusted to satisfy the above range, a combination of excellent curability and flexibility of the coating film on the printed matter can be achieved with ease. In one embodiment, at least one compound selected from the group consisting of ethylene oxide-modified pentaerythritol tetraacrylates, ethylene oxide-modified diglycerol tetraacrylates, ethylene oxide-modified trimethylolpropane triacrylates, and ethylene oxide-modified ditrimethylolpropane tetraacrylates is preferably used as the (meth)acrylate compound (a). By using this type of embodiment, the coating film can be easily imparted with antistatic properties due to the increase in the polarity of the coating varnish provided by the ethylene oxide adduct.

(Photopolymerization Initiator)

In the present invention, from the viewpoint of suppressing outward migration from the printed matter, the photopolymerization initiator (B) that represents a main component of the coating varnish preferably has a weight-average molecular weight of at least 300. Further, the photopolymerization initiator (B) is preferably a compound that can cause efficient progression of the photopolymerization reaction upon ultraviolet irradiation with a high-pressure mercury lamp and/or a metal halide lamp that emits ultraviolet rays of 200 to 420 nm. In other words, the weight-average molecular weight of the photopolymerization initiator (B) is preferably at least 300 from the viewpoint of the migration characteristics, and preferably not more than 2,000 from the viewpoint of the curability. In one embodiment, the weight-average molecular weight of the photopolymerization initiator (B) is preferably within a range from 300 to 2,000, more preferably within a range from 300 to 1,000, and even more preferably within a range from 300 to 700. Moreover, the photopolymerization initiator (B) preferably has a large molar extinction coefficient in the wavelength region in which the high-pressure mercury lamp and/or metal halide lamp emits with a particularly high intensity.

In the active energy ray-curable coating varnish, low yellowing characteristics are required in addition to superior curability. Examples of photopolymerization initiators that are widely used in active energy ray-curable inks or the aforementioned coating varnishes include α-hydroxyalkylphenone compounds, α-aminoalkylphenone compounds, acylphosphine oxide compounds, thioxanthone compounds and benzophenone compounds. However, in coating varnishes in which low yellowing characteristics are particularly important, the use of α-aminoalkylphenone compounds or thioxanthone compounds which exhibit significant yellowing over time is difficult. Further, acylphosphine oxide compounds have a small molar extinction coefficient, and therefore tend to result in poor surface curability of the coating film when used alone. Moreover, benzophenone compounds, if not polymer type compounds, tend to exhibit high migratability, meaning their use in an active energy ray-curable coating varnish used as a material for foodstuff or pharmaceutical packaging is problematic. Furthermore, polymer type benzophenone compounds suffer from poor solubility, and therefore the upper limit for the amount of the compound added to the coating varnish is small, and often insufficient from the viewpoint of curability.

On the other hand, α-hydroxyalkylphenone compounds have a comparatively high molar extinction coefficient and low yellowing characteristics. As a result, α-hydroxyalkylphenone compounds (b) are preferred for the photopolymerization initiator (B) in the present invention. The molar extinction coefficients at various wavelengths of the main α-hydroxyalkylphenone compounds (b) are shown in Table 1. In the present invention, the letter "l" in the units (1/mol·cm) for the molar extinction coefficient represents liter, indicating a unit of volume.

In the present invention, the amount of the photopolymerization initiator (B) relative to the total weight of the active energy ray-curable coating varnish is preferably within a range from 0.1 to 15.0% by weight, more preferably within a range from 3.0 to 12.0% by weight, and even more preferably within a range from 3.0 to 10.0% by weight. When the amount satisfies the above range, a combination of excellent curability and migration suppression can be achieved with ease. In one embodiment, the photopolymerization initiator (B) contains at least one of (b1) 2-hydroxy-1-[4-[4-(2-hydroxy-2-methyl-propionyl)-benzyl]-phenyl]-2-methylpropan-1-one, and (b2) oligo[2-hydroxy-2-methyl-1-[4-(1-methylvinyl)phenyl]propanone]. Further, in one embodiment, the active energy ray-curable coating varnish contains, relative to the total weight of the varnish, at least one of 0.01 to 5.0% by weight of the above compound (b1) and 0.01 to 5.0% by weight of the above compound (b2), and the total weight of the photopolymerization initiator (B) is within a range from 1.0 to 15.0% by weight.

In the present invention, the use of photopolymerization initiators other than the aforementioned photopolymerization initiator (B) is not excluded. In the present invention, the active energy ray-curable coating varnish may include other photopolymerization initiators besides the photopolymerization initiator (B) in amounts that do not impair the low yellowing characteristics, or are not detectable in the migration test described below.

Examples of hydrogen abstraction-type photopolymerization initiators include benzophenone, p-methylbenzophenone, p-chlorobenzophenone, tetrachlorobenzophenone, methyl benzoylbenzoate, 4-phenylbenzophenone, hydroxybenzophenone, 4-benzoyl-4'-methyl-diphenyl sulfide, 2-isopropylthioxanthone, 2,4-dimethylthioxanthone, 2,4-diethyl-

TABLE 1

| Chemical name | Weight-average molecular weight | Molar extinction coefficient ($\times 10^2$) (l/mol · cm) | | | | |
| --- | --- | --- | --- | --- | --- | --- |
| | | 254 nm | 302 nm | 313 nm | 365 nm | 405 nm |
| 2-hydroxy-1-[4-[4-(2-hydroxy-2-methyl-propionyl)-benzyl]-phenyl]-2-methylpropan-1-one | 340 | 733.0 | 11.0 | 8.3 | 1.3 | 0.1 |
| oligo{2-hydroxy-2-methyl-1-[4-(1-methylvinyl)phenyl]propanone} | 409 | 734.0 | 11.2 | 8.4 | 1.1 | 0.1 |
| 1-hydroxycyclohexyl phenyl ketone | 204 | 331.7 | 5.8 | 4.3 | 0.9 | — |
| 2-hydroxy-2-methyl-1-phenyl-propan-1-one | 164 | 406.4 | 8.2 | 5.6 | 0.7 | — |

Among the various α-hydroxyalkylphenone compounds (b), by selecting a compound having a comparatively large weight-average molecular weight, low migration characteristics can be achieved with ease. For this reason, in the present invention, the use of at least one of (b1) 2-hydroxy-1-[4-[4-(2-hydroxy-2-methyl-propionyl)-benzyl]-phenyl]-2-methylpropan-1-one and (b2) oligo[2-hydroxy-2-methyl-1-[4-(1-methylvinyl)phenyl]propanone] is preferred. These compounds are beneficial for a number of reasons. In other words, because these compounds each have a weight-average molecular weight of at least 300, excellent migration suppression can be obtained. Further, these compounds also have a high molar extinction coefficient near 254 nm, which is one of the main emission wavelengths of a high-pressure mercury lamp and/or metal halide lamp. Accordingly, when the above compounds are used, excellent reaction efficiency can be achieved, meaning there is minimal risk of unreacted compounds remaining within the coating varnish.

thioxanthone, 2,4-dichlorothioxanthone, acetophenone, aryl ketone-based initiators, 4,4'-bis(diethylamino)benzophenone, 4,4'-bis(dimethylamino)benzophenone, isoamyl p-dimethylaminobenzoate, p-dimethylaminoacetophenone, dialkylaminoaryl ketone-based initiators, thioxanthone, xanthone systems and halogen-substituted products thereof, and polycyclic carbonyl-based initiators.

Furthermore, examples of cleavage-type photopolymerization initiators include benzoin, benzoin methyl ether, benzoin isopropyl ether, α-acryl benzoin, benzoin systems, benzil, 2-methyl-2-morpholino(4-thiomethylphenyl)propan-1-one, 2-benzyl-2-dimethylamino-1-(4-morpholinophenyl)-1-butanone, benzyl methyl ketal, 1-hydroxycyclohexyl phenyl ketone, 2-hydroxy-2-methyl-1-phenylpropan-1-one, 1-(4-isopropylphenyl)-2-hydroxy-2-methylpropan-1-one, 4-(2-hydroxyethoxyl)phenyl-(2-hydroxy-2-propyl) ketone, 4-(2-acryloyloxyethoxy)phenyl-2-hydroxy-2-propyl ketone, and diethoxyacetophenone.

In one embodiment, in addition to the components described above, the coating varnish may also contain a photopolymerization assistant. Specific examples of the photopolymerization assistant include triethanolamine, methyldiethanolamine, triisopropanolamine, aliphatic amines, 4,4'-diethylaminobenzophenone, ethyl 2-dimethylaminobenzoate, ethyl 4-dimethylaminobenzoate, isoamyl 4-dimethylaminobenzoate, and dibutylethanolamine.

In one embodiment, from the viewpoints of the coatability and the coating film physical properties such as the rub resistance, the coating varnish may also contain, in addition to the components described above, a resin or an oligomer. Specific examples of compounds that may be used as this resin or oligomer include thermoplastic resins such as polyester resins, acrylic resins, styrene-acrylic resins, petroleum resins and urethane resins, and thermosetting resins such as epoxy resins and amino resins which lack a radical polymerizable double bond within the molecule.

(Various Additives)

If required, the coating varnish may also contain, in addition to the components described above, any of the various known additives typically used in this technical field.

Specific examples of additives used for imparting rub resistance, anti-blocking properties, slipperiness and scratch prevention include natural waxes such as carnauba wax, Japan wax, lanolin, montan wax, paraffin wax and microcrystalline wax, and synthetic waxes such as Fisher-Tropsch wax, polyethylene wax, polypropylene wax, polytetrafluoroethylene wax, polyamide wax and silicone compounds.

For example, polymerization inhibitors may be used as additives for imparting storage stability to the coating varnish. Specific examples of such polymerization inhibitors include (alkyl)phenols, hydroquinone, catechol, resorcin, p-methoxyphenol, tert-butylcatechol, tert-butylhydroquinone, pyrogallol, 1,1-picrylhydrazyl, phenothiazine, p-benzoquinone, nitrosobenzene, 2,5-di-tert-butyl-p-benzoquinone, dithiobenzoyl disulfide, picric acid, cupferron, aluminum N-nitrosophenylhydroxylamine, N-(3-oxyanilino-1,3-dimethylbutylidene)aniline oxide, dibutylcresol, cyclohexanone oxime cresol, guaiacol, o-isopropylphenol, butyraldoxime, methyl ethyl ketoxime and cyclohexanone oxime.

In addition, various other additives such as ultraviolet absorbers, infrared absorbers and antibacterial agents may also be added to the coating varnish in addition to the components described above, depending on the performance required.

In one embodiment, a certain amount of an extender pigment typified by talc or silica may also be added to the coating varnish. In the present invention, a coating varnish containing this type of extender pigment may be prepared and used as a matt varnish that can impart the coating film with a matt finish.

Another aspect of the present invention relates to a printed item that uses the aforementioned coating varnish of the present invention. The printed item can be produced by printing the coating varnish of the present invention onto a substrate to form a printed layer, and then irradiating the surface of the printed layer (the coating film) with active energy rays such as ultraviolet rays to cure the printed layer. Examples of the substrate include commercial printing papers (art paper, coated paper, wood-free paper, matt coated paper), thick cardboard sheets (cardboard, milk carton sheet, Kent paper, corrugated cardboard), aluminum-coated paper, and synthetic paper (Yupo paper), and the thickness of the substrate is preferably not more than 2.0 mm. In one embodiment, the printed item is preferably used as a packaging material for foodstuffs and pharmaceuticals. In one embodiment, the printed item includes the substrate, a first printed layer formed using an ink, and a second printed layer formed using the coating varnish. In these types of cases where the printed item has a plurality of printed layers, the printed layer formed using the coating varnish is preferably formed as the outermost layer.

EXAMPLES

The present invention is described below in further detail using a series of examples, but the present invention is in no way limited by these examples. In the following description, "parts" and "%" represent "parts by weight" and "% by weight" respectively.

Weight-average molecular weights were measured using a gel permeation chromatography apparatus (HLC8020) manufactured by Tosoh Corporation. The solvent used during measurement was tetrahydrofuran, and polystyrenes were used as the calibration curve standard samples.

1. Preparation of Coating Varnishes

Examples 1 to 50 and Comparative Examples 1 to 45

Using each of the formulations (blend amounts) shown in Table 2 to Table 7, the raw materials were placed in a butterfly mixer, and stirred and mixed at a temperature of 50° C. to completely dissolve the photopolymerization initiator and the polymerization inhibitor, thus completing preparation of a series of active energy ray-curable coating varnishes. The compounds used as the raw materials for the coating varnishes are listed below. In each table, the entries such as "trifunctional" and "tetrafunctional" disclosed in relation to the (meth)acrylate compounds mean the number of (meth)acrylic groups included in one molecule of that particular (meth)acrylate compound. For example, "trifunctional" means that three (meth)acrylic groups are contained within each molecule of the (meth)acrylate compound.

<(Meth)acrylate Compounds (A)>
Ethylene Oxide-Modified (meth)acrylate Compounds (a)
  A1: ethylene oxide-modified (n=4) pentaerythritol tetraacrylate
  A2: ethylene oxide-modified (n=4) diglycerol tetraacrylate
  A3: ethylene oxide-modified (n=4) ditrimethylolpropane tetraacrylate
  A4: ethylene oxide-modified (n=6) trimethylolpropane triacrylate
Compounds (A) Other than the Ethylene Oxide-Modified (meth)acrylate Compounds (a)
  A5: ethylene oxide-modified (n=9) trimethylolpropane triacrylate
  A6: dipentaerythritol pentaacrylate
  A7: dipentaerythritol hexaacrylate
  A8: propylene oxide-modified (n=4) diglycerol tetraacrylate
<(Meth)acrylate Compounds Other than the Compound (A)>
  A9: ethylene oxide-modified (n=3) trimethylolpropane triacrylate
  A10: propylene oxide-modified (n=3) trimethylolpropane triacrylate
  A11: ditrimethylolpropane tetraacrylate
  A12: trimethylolpropane triacrylate <Photopolymerization Initiators>

Compounds b1, b2, and b5 to b7 described below correspond with the photopolymerization initiator (B) having a weight-average molecular weight within a range from 300 to 2,000, whereas the other compounds are photopolymerization initiators having a weight-average molecular weight outside this range.

b1: 2-hydroxy-1-[4-[4-(2-hydroxy-2-methyl-propionyl)-benzyl]-phenyl]-2-methylpropan-1-one, b2: oligo[2-hydroxy-2-methyl-1-[4-(1-methylvinyl)phenyl]propanone]

b3: 1-hydroxycyclohexyl phenyl ketone b4: 2-methyl-1-[4-(methylthio)phenyl]-2-morpholinopropan-1-one b5: 2-(dimethylamino)-1-(4-morpholinophenyl)-2-benzyl-1-butanone b6: bis(2,4,6-trimethylbenzoyl)-phenylphosphine oxide b7: 2,4,6-trimethylbenzoyl-diphenylphosphine oxide b8: 2,4-diethylthioxanthone b9: benzophenone <Polymerization Inhibitor> hydroquinone (manufactured by Seiko Chemical Co., Ltd.)

2. Various Evaluations of Coating Varnishes

Each of the active energy ray-curable coating varnishes prepared in Examples 1 to 50 and Comparative Examples 1 to 45 was evaluated for each of the properties described below. The evaluation results are summarized in Table 2 to Table 7.

<Evaluation of Curability>

The coating varnish was printed onto the surface of a milk carton sheet, namely a PE-coated paper (Tohei Pak Carton, manufactured by Hokuetsu Kishu Paper Co., Ltd., thickness: 0.5 mm), at 0.0003 g/cm$^2$ using an RI tester. An RI tester is a test device used for printing an ink or a coating varnish onto a paper or film, and is able to adjust the amount of ink or coating varnish transferred and the printing pressure. Subsequently, using a metal halide lamp (manufactured by Eye Graphics Co., Ltd.) or a high-pressure mercury lamp (manufactured by Eye Graphics Co., Ltd.) as an irradiation device, ultraviolet irradiation of the printed surface was performed under conditions including an irradiation output of 160 W/cm, an irradiation distance of 10 mm, and a conveyor speed of 80 m/minute. Under the above irradiation output and irradiation distance conditions, the irradiation dose at a conveyor speed of 80 m/minute can be considered to satisfy the standard level of irradiation in a production process for a printed packaging item by an offset sheet-fed printing press that performs printing using a plurality of high-pressure mercury lamps and/or metal halide lamps.

Following the ultraviolet irradiation, the printed surface was rubbed with a cotton cloth, and the presence or absence of color on the cotton cloth upon visual inspection was used to evaluate the "curability" against the following evaluation criteria.

(Evaluation Criteria)

○: No coloring of cloth, suitable for practical application

Δ: Very slight coloring of cloth, but suitable for practical application

×: Significant coloring of cloth, not suitable for practical application

<Evaluation of Yellowing>

The coating varnish was printed onto the surface of a milk carton sheet, namely a PE-coated paper (Tohei Pak Carton, manufactured by Hokuetsu Kishu Paper Co., Ltd., thickness: 0.5 mm), at 0.0003 g/cm$^2$ using an RI tester. Subsequently, using a metal halide lamp (manufactured by Eye Graphics Co., Ltd.) or a high-pressure mercury lamp (manufactured by Eye Graphics Co., Ltd.) as an irradiation device, ultraviolet irradiation of the printed surface was performed under conditions including an irradiation output of 160 W/cm, an irradiation distance of 10 mm, and a conveyor speed of 60 m/minute. The degree of yellowing of the printed surface (coating varnish) following the ultraviolet irradiation was evaluated visually.

(Evaluation Criteria)

○: No yellowing, suitable for practical application

Δ: Slight yellowing, but suitable for practical application

×: Significant yellowing, not suitable for practical application

<Evaluation of Cracking>

The coating varnish was printed onto the surface of an art paper (Tokubishi art both surfaces N: manufactured by Mitsubishi Paper Mills Limited, thickness: 0.1 mm) at 0.0003 g/cm$^2$ using an RI tester. Subsequently, using a metal halide lamp (manufactured by Eye Graphics Co., Ltd.) or a high-pressure mercury lamp (manufactured by Eye Graphics Co., Ltd.) as an irradiation device, ultraviolet irradiation of the printed surface was performed under conditions including an irradiation output of 160 W/cm, an irradiation distance of 10 mm, and a conveyor speed of 60 m/minute. Following the ultraviolet irradiation, the printed surface (coating varnish) was folded outward through 180°, and the state of the coating varnish film following the folding was evaluated visually.

(Evaluation Criteria)

○: No cracking of the coating film, suitable for practical application

Δ: Slight cracking of the coating film, but suitable for practical application

×: Significant cracking of the coating film, not suitable for practical application <Evaluation of Migration>

The coating varnish was used to form a printed layer in accordance with (i) to (iv) described below, and the concentrations of the (meth)acrylate compound (A) and the photopolymerization initiator in ethanol were measured.

(i) The active energy ray-curable coating varnish was printed onto a 100 cm$^2$ substrate (Tohei Pak Carton, manufactured by Hokuetsu Kishu Paper Co., Ltd., thickness: 0.5 mm) at 0.0003 g/cm$^2$, thus forming a printed layer.

(ii) Using a metal halide lamp irradiation device (manufactured by Eye Graphics Co., Ltd.), the printed layer was irradiated with ultraviolet rays under conditions including an irradiation output of 160 W/cm, an irradiation distance of 10 mm, and a conveyor speed of 80 m/minute, thereby curing the printed layer. Instead of the substrate described above, a commercial printing paper (art paper, coated paper, wood-free paper, matt coated paper), a thick cardboard sheet (cardboard, milk carton sheet, Kent paper, corrugated cardboard), an aluminum-coated paper, or a synthetic paper (Yupo paper), each having a thickness of not more than 2.0 mm, may also be used.

(iii) A polypropylene film (PP film) with a thickness of 0.2 mm having the same surface area as the printed layer was overlaid on the printed layer, and was left to stand for 10 days in an environment at 25° C. and 50% humidity while applying a load of 0.02 kg/cm$^2$. A film of Sheedom Aqua (thickness: 0.2 mm) manufactured by Sheedom Co., Ltd. was used as the PP film.

(iv) The PP film was removed and immersed for 10 days in 100 ml of ethanol in an environment at 60° C. and 50% humidity, and the concentrations of the (meth)acrylate compound (A) and the photopolymerization initiator (B) in the ethanol were then measured. Measurements of the concentration levels were performed using an LC-MS (high performance liquid chromatography-mass spectrometer) manufactured by Waters Corporation.

Based on the concentrations (detected amounts) of the (meth)acrylate compound and the photopolymerization initiator in the ethanol, measured in the manner described above, the outward migration characteristics of the coating varnish were evaluated against the following criteria. As described below, if the detected amounts were each less than 100 ppb, then the coating varnish was deemed to satisfy the low migration standards required of the present invention, meaning the coating varnish was able to be used favorably as a packing material for foodstuffs and pharmaceuticals. In contrast, if either of the detected amounts was 100 ppb or greater, then the coating varnish was deemed to not satisfy the low migration standards required of the present invention, and therefore lack practical applicability.

(Evaluation Criteria)

○: detected amounts of less than 100 ppb, suitable for practical application

×: detected amounts of 100 ppb or greater, not suitable for practical application <Evaluation of Antistatic Properties>

Using a sheet-fed printing press Lithrone 26 (with attached coater) manufactured by Komori Corporation, the coating varnish was printed onto the surface of a PE-coated paper (Tohei Pak Carton, manufactured by Hokuetsu Kishu Paper Co., Ltd., thickness: 0.5 mm). The thus obtained printed matter was reloaded into the substrate supply unit of the printing press, and a paper feed test was performed at a rate of 10,000 sheets per hour to investigate whether the substrate would pass favorably through the printing press. In those cases where, as a result of the static or the like on the substrate, an appropriate feed direction or feed spacing is unable to be maintained, the substrate stops within the printing press line. As described below, if 1,000 sheets were able to be fed without problem from the start of the paper feed test, then the line applicability was judged as favorable. In contrast, if the substrate feed stopped before 1,000 sheets were able to be fed from the start of the paper feed test, the line applicability was judged as poor.

(Evaluation Criteria)

○: 1,000 sheets could be fed, suitable for practical application

×: sheet feeding stopped prior to 1,000 sheets, not suitable for practical application As is evident from the results shown in the tables, compared with the coating varnishes of the comparative examples, the coating varnishes according to the present invention (Examples 1 to 50) exhibited suppressed outward migration of the (meth)acrylate monomer and the photopolymerization initiator from the printed matter, and were able to satisfy the safety standards demanded in the current market environment for inks for foodstuff and pharmaceutical packaging. Further, the curability was excellent, and because the line applicability was also excellent due to the antistatic effect imparted to the printed matter, favorable productivity could also be achieved.

TABLE 2

| Classification | | | Chemical name | Weight-average molecular weight | (Meth)acrylate equivalent weight | Example 1 | 2 | 3 | 4 | 5 | 6 | 7 | 8 |
|---|---|---|---|---|---|---|---|---|---|---|---|---|---|
| (Meth)acrylate compound | tetrafunctional | EO-modified | A1 | 528 | 132 | 94.9 | 50.0 | 50.0 | 50.0 | 50.0 | | | |
| | tetrafunctional | EO-modified | A2 | 534 | 134 | | | | | | 94.9 | 50.0 | 50.0 |
| | tetrafunctional | EO-modified | A3 | 658 | 165 | | | | | | | | |
| | trifunctional | EO-modified | A4 | 560 | 187 | | | | | | | | |
| | trifunctional | EO-modified | A5 | 692 | 231 | | 44.9 | | | | | 44.9 | |
| | hexafunctional | no modification | A6 | 535 | 107 | | | 44.9 | | | | | 44.9 |
| | pentafunctional | no modification | A7 | 578 | 96 | | | | 44.9 | | | | |
| | tetrafunctional | PO-modified | A8 | 576 | 144 | | | | | 44.9 | | | |
| | trifunctional | EO-modified | A9 | 428 | 143 | | | | | | | | |
| | trifunctional | PO-modified | A10 | 470 | 157 | | | | | | | | |
| | tetrafunctional | no modification | A11 | 482 | 121 | | | | | | | | |
| | trifunctional | no modification | A12 | 296 | 99 | | | | | | | | |
| Photopolymerization initiator | α-hydroxyalkylphenone compound | | b1 | 340 | | 5.0 | 5.0 | 5.0 | 5.0 | 5.0 | 5.0 | 5.0 | 5.0 |
| | | | b2 | 409 | | | | | | | | | |
| | | | b3 | 204 | | | | | | | | | |
| | α-aminoalkylphenone compound | | b4 | 279 | | | | | | | | | |
| | | | b5 | 367 | | | | | | | | | |
| | acylphosphine oxide compound | | b6 | 419 | | | | | | | | | |
| | | | b7 | 348 | | | | | | | | | |
| | thioxanthone compound | | b8 | 268 | | | | | | | | | |
| | benzophenone compound | | b9 | 182 | | | | | | | | | |
| Polymerization inhibitor | hydroquinone (hydroquinone) | | | — | | 0.1 | 0.1 | 0.1 | 0.1 | 0.1 | 0.1 | 0.1 | 0.1 |
| Total | | | | | | 100 | 100 | 100 | 100 | 100 | 100 | 100 | 100 |
| Curing rate | | | metal halide lamp | | | ○ | ○ | ○ | ○ | Δ | ○ | ○ | ○ |
| | | | mercury lamp | | | ○ | ○ | ○ | ○ | Δ | ○ | ○ | ○ |
| Low yellowing characteristics | | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |
| Cracking resistance | | | metal halide lamp | | | ○ | ○ | Δ | Δ | ○ | ○ | ○ | Δ |
| | | | mercury lamp | | | ○ | ○ | Δ | Δ | ○ | ○ | ○ | Δ |
| Low migration characteristics | | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |
| Antistatic properties | | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |

TABLE 2-continued

| Classification | | | Chemical name | Weight-average molecular weight | (Meth)acrylate equivalent weight | Example 9 | 10 | 11 | 12 | 13 | 14 | 15 |
|---|---|---|---|---|---|---|---|---|---|---|---|---|
| (Meth)acrylate compound | tetrafunctional | EO-modified | A1 | 528 | 132 | | | | | | | |
| | tetrafunctional | EO-modified | A2 | 534 | 134 | 50.0 | 50.0 | | | | | |
| | tetrafunctional | EO-modified | A3 | 658 | 165 | | | 94.9 | 50.0 | 50.0 | 50.0 | 50.0 |
| | trifunctional | EO-modified | A4 | 560 | 187 | | | | | | | |
| | trifunctional | EO-modified | A5 | 692 | 231 | | | | | 44.9 | | |
| | hexafunctional | no modification | A6 | 535 | 107 | | | | | | 44.9 | |
| | pentafunctional | no modification | A7 | 578 | 96 | 44.9 | | | | | | 44.9 |
| | tetrafunctional | PO-modified | A8 | 576 | 144 | | | | 44.9 | | | 44.9 |
| | trifunctional | EO-modified | A9 | 428 | 143 | | | | | | | |
| | trifunctional | PO-modified | A10 | 470 | 157 | | | | | | | |
| | tetrafunctional | no modification | A11 | 482 | 121 | | | | | | | |
| | trifunctional | no modification | A12 | 296 | 99 | | | | | | | |
| Photo-polymerization initiator | α-hydroxyalkylphenone compound | | b1 | 340 | | 5.0 | 5.0 | 5.0 | 5.0 | 5.0 | 5.0 | 5.0 |
| | | | b2 | 409 | | | | | | | | |
| | | | b3 | 204 | | | | | | | | |
| | α-aminoalkylphenone compound | | b4 | 279 | | | | | | | | |
| | | | b5 | 367 | | | | | | | | |
| | acylphosphine oxide compound | | b6 | 419 | | | | | | | | |
| | | | b7 | 348 | | | | | | | | |
| | thioxanthone compound | | b8 | 268 | | | | | | | | |
| | benzophenone compound | | b9 | 182 | | | | | | | | |
| Polymerization inhibitor | hydroquinone (hydroquinone) | | | — | | 0.1 | 0.1 | 0.1 | 0.1 | 0.1 | 0.1 | 0.1 |
| Total | | | | | | 100 | 100 | 100 | 100 | 100 | 100 | 100 |
| Curing rate | | | metal halide lamp | | | ○ | Δ | ○ | ○ | ○ | ○ | Δ |
| | | | mercury lamp | | | ○ | Δ | ○ | ○ | ○ | ○ | Δ |
| Low yellowing characteristics | | | metal halide lamp | | | ○ | ○ | ○ | ○ | ○ | ○ | ○ |
| | | | mercury lamp | | | ○ | ○ | ○ | ○ | ○ | ○ | ○ |
| Cracking resistance | | | metal halide lamp | | | Δ | ○ | ○ | ○ | Δ | Δ | ○ |
| | | | mercury lamp | | | Δ | ○ | ○ | ○ | Δ | Δ | ○ |
| Low migration characteristics | | | metal halide lamp | | | ○ | ○ | ○ | ○ | ○ | ○ | ○ |
| | | | mercury lamp | | | ○ | ○ | ○ | ○ | ○ | ○ | ○ |
| Antistatic properties | | | metal halide lamp | | | ○ | ○ | ○ | ○ | ○ | ○ | ○ |
| | | | mercury lamp | | | ○ | ○ | ○ | ○ | ○ | ○ | ○ |

TABLE 3

| Classification | | | Chemical name | Weight-average molecular weight | (Meth)acrylate equivalent weight | Example 16 | 17 | 18 | 19 | 20 | 21 | 22 | 23 | 24 | 25 |
|---|---|---|---|---|---|---|---|---|---|---|---|---|---|---|---|
| (Meth)acrylate compound | tetrafunctional | EO-modified | A1 | 528 | 132 | | | | | | 12.5 | 12.5 | 12.5 | 12.5 | 94.9 |
| | tetrafunctional | EO-modified | A2 | 534 | 134 | | | | | | 12.5 | 12.5 | 12.5 | 12.5 | |
| | tetrafunctional | EO-modified | A3 | 658 | 165 | | | | | | 12.5 | 12.5 | 12.5 | 12.5 | |
| | trifunctional | EO-modified | A4 | 560 | 187 | 94.9 | 50.0 | 50.0 | 50.0 | 50.0 | 12.5 | 12.5 | 12.5 | 12.5 | |
| | trifunctional | EO-modified | A5 | 692 | 231 | | 44.9 | | | | 44.9 | | | | |
| | hexafunctional | no modification | A6 | 535 | 107 | | | 44.9 | | | | 44.9 | | | |
| | pentafunctional | no modification | A7 | 578 | 96 | | | | 44.9 | | | | 44.9 | | |
| | tetrafunctional | PO-modified | A8 | 576 | 144 | | | | | 44.9 | | | | 44.9 | |
| | trifunctional | EO-modified | A9 | 428 | 143 | | | | | | | | | | |
| | trifunctional | PO-modified | A10 | 470 | 157 | | | | | | | | | | |
| | tetrafunctional | no modification | A11 | 482 | 121 | | | | | | | | | | |
| | trifunctional | no modification | A12 | 296 | 99 | | | | | | | | | | |
| Photo-polymerization initiator | α-hydroxyalkylphenone compound | | b1 | 340 | | 5.0 | 5.0 | 5.0 | 5.0 | 5.0 | 5.0 | 5.0 | 5.0 | 5.0 | |
| | | | b2 | 409 | | | | | | | | | | | 5.0 |
| | | | b3 | 204 | | | | | | | | | | | |
| | α-aminoalkylphenone compound | | b4 | 279 | | | | | | | | | | | |
| | | | b5 | 367 | | | | | | | | | | | |
| | acylphosphine oxide compound | | b6 | 419 | | | | | | | | | | | |
| | | | b7 | 348 | | | | | | | | | | | |
| | thioxanthone compound | | b8 | 268 | | | | | | | | | | | |
| | benzophenone compound | | b9 | 182 | | | | | | | | | | | |
| Polymerization inhibitor | hydroquinone (hydroquinone) | | | — | | 0.1 | 0.1 | 0.1 | 0.1 | 0.1 | 0.1 | 0.1 | 0.1 | 0.1 | 0.1 |
| Total | | | | | | 100 | 100 | 100 | 100 | 100 | 100 | 100 | 100 | 100 | 100 |

TABLE 3-continued

| | | 
|---|---|
| Curing rate | metal halide lamp | ○ ○ ○ ○ △ ○ ○ ○ △ ○ |
| | mercury lamp | ○ ○ ○ ○ △ ○ ○ ○ △ ○ |
| Low yellowing characteristics | metal halide lamp | ○ ○ ○ ○ ○ ○ ○ ○ ○ ○ |
| | mercury lamp | ○ ○ ○ ○ ○ ○ ○ ○ ○ ○ |
| Cracking resistance | metal halide lamp | ○ ○ △ △ ○ ○ ○ △ △ ○ |
| | mercury lamp | ○ ○ △ △ ○ ○ ○ △ △ ○ |
| Low migration characteristics | metal halide lamp | ○ ○ ○ ○ ○ ○ ○ ○ ○ ○ |
| | mercury lamp | ○ ○ ○ ○ ○ ○ ○ ○ ○ ○ |
| Antistatic properties | metal halide lamp | ○ ○ ○ ○ ○ ○ ○ ○ ○ ○ |
| | mercury lamp | ○ ○ ○ ○ ○ ○ ○ ○ ○ ○ |

| Classification | | Chemical name | Weight-average molecular weight | (Meth)acrylate equivalent weight | Example 26 | 27 | 28 | 29 | 30 | 31 | 32 | 33 | 34 |
|---|---|---|---|---|---|---|---|---|---|---|---|---|---|
| (Meth)acrylate compound | tetrafunctional EO-modified | A1 | 528 | 132 | 50.0 | 50.0 | 50.0 | 50.0 | | | | | |
| | tetrafunctional EO-modified | A2 | 534 | 134 | | | | | 94.9 | 50.0 | 50.0 | 50.0 | 50.0 |
| | tetrafunctional EO-modified | A3 | 658 | 165 | | | | | | | | | |
| | trifunctional EO-modified | A4 | 560 | 187 | | | | | | | | | |
| | trifunctional EO-modified | A5 | 692 | 231 | 44.9 | | | | | 44.9 | | | |
| | hexafunctional no modification | A6 | 535 | 107 | | 44.9 | | | | | 44.9 | | |
| | pentafunctional no modification | A7 | 578 | 96 | | | 44.9 | | | | | 44.9 | |
| | tetrafunctional PO-modified | A8 | 576 | 144 | | | | 44.9 | | | | | 44.9 |
| | trifunctional EO-modified | A9 | 428 | 143 | | | | | | | | | |
| | trifunctional PO-modified | A10 | 470 | 157 | | | | | | | | | |
| | tetrafunctional no modification | A11 | 482 | 121 | | | | | | | | | |
| | trifunctional no modification | A12 | 296 | 99 | | | | | | | | | |
| Photopolymerization initiator | α-hydroxyalkylphenone compound | b2 | 409 | | | | | | | | | | |
| | | b3 | 204 | | 5.0 | 5.0 | 5.0 | 5.0 | 5.0 | 5.0 | 5.0 | 5.0 | 5.0 |
| | α-aminoalkylphenone compound | b4 | 279 | | | | | | | | | | |
| | | b5 | 367 | | | | | | | | | | |
| | acylphosphine oxide compound | b6 | 419 | | | | | | | | | | |
| | | b7 | 348 | | | | | | | | | | |
| | thioxanthone compound | b8 | 268 | | | | | | | | | | |
| | benzophenone compound | b9 | 182 | | | | | | | | | | |
| Polymerization inhibitor | hydroquinone (hydroquinone) | — | | | 0.1 | 0.1 | 0.1 | 0.1 | 0.1 | 0.1 | 0.1 | 0.1 | 0.1 |
| Total | | | | | 100 | 100 | 100 | 100 | 100 | 100 | 100 | 100 | 100 |
| Curing rate | metal halide lamp | | | | ○ | ○ | ○ | △ | ○ | ○ | ○ | ○ | △ |
| | mercury lamp | | | | ○ | ○ | ○ | △ | ○ | ○ | ○ | ○ | △ |
| Low yellowing characteristics | metal halide lamp | | | | ○ | ○ | ○ | ○ | ○ | ○ | ○ | ○ | ○ |
| | mercury lamp | | | | ○ | ○ | ○ | ○ | ○ | ○ | ○ | ○ | ○ |
| Cracking resistance | metal halide lamp | | | | ○ | △ | △ | ○ | ○ | ○ | △ | △ | ○ |
| | mercury lamp | | | | ○ | △ | △ | ○ | ○ | ○ | △ | △ | ○ |
| Low migration characteristics | metal halide lamp | | | | ○ | ○ | ○ | ○ | ○ | ○ | ○ | ○ | ○ |
| | mercury lamp | | | | ○ | ○ | ○ | ○ | ○ | ○ | ○ | ○ | ○ |
| Antistatic properties | metal halide lamp | | | | ○ | ○ | ○ | ○ | ○ | ○ | ○ | ○ | ○ |
| | mercury lamp | | | | ○ | ○ | ○ | ○ | ○ | ○ | ○ | ○ | ○ |

TABLE 4

| Classification | | Chemical name | Weight-average molecular weight | (Meth)acrylate equivalent weight | Example 35 | 36 | 37 | 38 | 39 | 40 | 41 | 42 |
|---|---|---|---|---|---|---|---|---|---|---|---|---|
| (Meth)acrylate compound | tetrafunctional EO-modified | A1 | 528 | 132 | | | | | | | | |
| | tetrafunctional EO-modified | A2 | 534 | 134 | | | | | | | | |
| | tetrafunctional EO-modified | A3 | 658 | 165 | 94.9 | 50.0 | 50.0 | 50.0 | 50.0 | | | |
| | trifunctional EO-modified | A4 | 560 | 187 | | | | | | 94.9 | 50.0 | 50.0 |
| | trifunctional EO-modified | A5 | 692 | 231 | | 44.9 | | | | | 44.9 | |
| | hexafunctional no modification | A6 | 535 | 107 | | | 44.9 | | | | | 44.9 |
| | pentafunctional no modification | A7 | 578 | 96 | | | | 44.9 | | | | |
| | tetrafunctional PO-modified | A8 | 576 | 144 | | | | | 44.9 | | | |
| | trifunctional EO-modified | A9 | 428 | 143 | | | | | | | | |
| | trifunctional PO-modified | A10 | 470 | 157 | | | | | | | | |
| | tetrafunctional no modification | A11 | 482 | 121 | | | | | | | | |
| | trifunctional no modification | A12 | 296 | 99 | | | | | | | | |

TABLE 4-continued

| Classification | | | Chemical name | Weight-average molecular weight | (Meth)acrylate equivalent weight | | | | | | | |
|---|---|---|---|---|---|---|---|---|---|---|---|---|
| Photo-polymerization initiator | α-hydroxyalkylphenone compound | | b1 | 340 | | | | | | | | |
| | | | b2 | 409 | | 5.0 | 5.0 | 5.0 | 5.0 | 5.0 | 5.0 | 5.0 | 5.0 |
| | | | b3 | 204 | | | | | | | | |
| | α-aminoalkylphenone compound | | b4 | 279 | | | | | | | | |
| | | | b5 | 367 | | | | | | | | |
| | acylphosphine oxide compound | | b6 | 419 | | | | | | | | |
| | | | b7 | 348 | | | | | | | | |
| | thioxanthone compound | | b8 | 268 | | | | | | | | |
| | benzophenone compound | | b9 | 182 | | | | | | | | |
| Polymerization inhibitor | hydroquinone (hydroquinone) | | | — | | 0.1 | 0.1 | 0.1 | 0.1 | 0.1 | 0.1 | 0.1 | 0.1 |
| | Total | | | | | 100 | 100 | 100 | 100 | 100 | 100 | 100 | 100 |
| | Curing rate | | metal halide lamp | | | ○ | ○ | ○ | ○ | Δ | ○ | ○ | ○ |
| | | | mercury lamp | | | ○ | ○ | ○ | ○ | Δ | ○ | ○ | ○ |
| | Low yellowing characteristics | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |
| | Cracking resistance | | metal halide lamp | | | ○ | ○ | Δ | Δ | ○ | ○ | ○ | Δ |
| | | | mercury lamp | | | ○ | ○ | Δ | Δ | ○ | ○ | ○ | Δ |
| | Low migration characteristics | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |
| | Antistatic properties | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |

| Classification | | | Chemical name | Weight-average molecular weight | (Meth)acrylate equivalent weight | Example | | | | | | | |
|---|---|---|---|---|---|---|---|---|---|---|---|---|---|
| | | | | | | 43 | 44 | 45 | 46 | 47 | 48 | 49 | 50 |
| (Meth)acrylate compound | tetrafunctional | EO-modified | A1 | 528 | 132 | | | | 12.5 | 12.5 | 12.5 | 12.5 | 84.9 | 84.9 |
| | tetrafunctional | EO-modified | A2 | 534 | 134 | | | 12.5 | 12.5 | 12.5 | 12.5 | | |
| | tetrafunctional | EO-modified | A3 | 658 | 165 | | | 12.5 | 12.5 | 12.5 | 12.5 | | |
| | trifunctional | EO-modified | A4 | 560 | 187 | 50.0 | 50.0 | 12.5 | 12.5 | 12.5 | 12.5 | | |
| | trifunctional | EO-modified | A5 | 692 | 231 | | | 44.9 | | | | | |
| | hexafunctional | no modification | A6 | 535 | 107 | | | | 44.9 | | | | |
| | pentafunctional | no modification | A7 | 578 | 96 | 44.9 | | | | 44.9 | | | |
| | tetrafunctional | PO-modified | A8 | 576 | 144 | | | | 44.9 | | | 44.9 | |
| | trifunctional | EO-modified | A9 | 428 | 143 | | | | | | | | |
| | trifunctional | PO-modified | A10 | 470 | 157 | | | | | | | | |
| | tetrafunctional | no modification | A11 | 482 | 121 | | | | | | | | |
| | trifunctional | no modification | A12 | 296 | 99 | | | | | | | | |
| Photo-polymerization initiator | α-hydroxyalkylphenone compound | | b1 | 340 | | | | | | | | 15.0 | |
| | | | b2 | 409 | | 5.0 | 5.0 | 5.0 | 5.0 | 5.0 | 5.0 | | 5.0 |
| | | | b3 | 204 | | | | | | | | | |
| | α-aminoalkylphenone compound | | b4 | 279 | | | | | | | | | |
| | | | b5 | 367 | | | | | | | | | |
| | acylphosphine oxide compound | | b6 | 419 | | | | | | | | | |
| | | | b7 | 348 | | | | | | | | | |
| | thioxanthone compound | | b8 | 268 | | | | | | | | | |
| | benzophenone compound | | b9 | 182 | | | | | | | | | |
| Polymerization inhibitor | hydroquinone (hydroquinone) | | | — | | 0.1 | 0.1 | 0.1 | 0.1 | 0.1 | 0.1 | 0.1 | 0.1 |
| | Total | | | | | 100 | 100 | 100 | 100 | 100 | 100 | 100 | 100 |
| | Curing rate | | metal halide lamp | | | ○ | Δ | ○ | ○ | ○ | Δ | ○ | ○ |
| | | | mercury lamp | | | ○ | Δ | ○ | ○ | ○ | Δ | ○ | ○ |
| | Low yellowing characteristics | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |
| | Cracking resistance | | metal halide lamp | | | Δ | ○ | ○ | Δ | Δ | ○ | ○ | ○ |
| | | | mercury lamp | | | Δ | ○ | ○ | Δ | Δ | ○ | ○ | ○ |
| | Low migration characteristics | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |
| | Antistatic properties | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |

TABLE 5

| Classification | | | Chemical name | Weight-average molecular weight | (Meth)acrylate equivalent weight | Comparative Example | | | | | | | |
|---|---|---|---|---|---|---|---|---|---|---|---|---|---|
| | | | | | | 1 | 2 | 3 | 4 | 5 | 6 | 7 | 8 |
| (Meth)acrylate compound | tetrafunctional | EO-modified | A1 | 528 | 132 | 44.9 | 44.9 | 44.9 | 44.9 | 44.9 | 44.9 | 44.9 | 44.9 |
| | tetrafunctional | EO-modified | A2 | 534 | 134 | | | | | | | | |
| | tetrafunctional | EO-modified | A3 | 658 | 165 | | | | | | | | |

TABLE 5-continued

|  |  |  |  | Weight-average molecular weight | (Meth)acrylate equivalent weight | | | | | | | |
|---|---|---|---|---|---|---|---|---|---|---|---|---|
| | trifunctional | EO-modified | A4 | 560 | 187 | | | | | | | | |
| | trifunctional | EO-modified | A5 | 692 | 231 | 50.0 | | | | | | | |
| | hexafunctional | no modification | A6 | 535 | 107 | | 50.0 | | | | | | |
| | pentafunctional | no modification | A7 | 578 | 96 | | | 50.0 | | | | | |
| | tetrafunctional | PO-modified | A8 | 576 | 144 | | | | 50.0 | | | | |
| | trifunctional | EO-modified | A9 | 428 | 143 | | | | | 50.0 | | | |
| | trifunctional | PO-modified | A10 | 470 | 157 | | | | | | 50.0 | | |
| | tetrafunctional | no modification | A11 | 482 | 121 | | | | | | | 50.0 | |
| | trifunctional | no modification | A12 | 296 | 99 | | | | | | | | 50.0 |
| Photo-polymerization initiator | α-hydroxyalkylphenone compound | | b1 | 340 | | 5.0 | 5.0 | 5.0 | 5.0 | 5.0 | 5.0 | 5.0 | 5.0 |
| | | | b2 | 409 | | | | | | | | | |
| | | | b3 | 204 | | | | | | | | | |
| | α-aminoalkylphenone compound | | b4 | 279 | | | | | | | | | |
| | | | b5 | 367 | | | | | | | | | |
| | acylphosphine oxide compound | | b6 | 419 | | | | | | | | | |
| | | | b7 | 348 | | | | | | | | | |
| | thioxanthone compound | | b8 | 268 | | | | | | | | | |
| | benzophenone compound | | b9 | 182 | | | | | | | | | |
| Polymerization inhibitor | hydroquinone (hydroquinone) | | | — | | 0.1 | 0.1 | 0.1 | 0.1 | 0.1 | 0.1 | 0.1 | 0.1 |
| | Total | | | | | 100 | 100 | 100 | 100 | 100 | 100 | 100 | 100 |
| Curing rate | | | metal halide lamp | | | × | ○ | ○ | × | ○ | × | ○ | ○ |
| | | | mercury lamp | | | × | ○ | ○ | × | ○ | × | ○ | ○ |
| Low yellowing characteristics | | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |
| Cracking resistance | | | metal halide lamp | | | ○ | × | × | ○ | ○ | ○ | ○ | ○ |
| | | | mercury lamp | | | ○ | × | × | ○ | ○ | ○ | ○ | ○ |
| Low migration characteristics | | | metal halide lamp | | | ○ | ○ | ○ | ○ | × | × | × | × |
| | | | mercury lamp | | | ○ | ○ | ○ | ○ | × | × | × | × |
| Antistatic properties | | | metal halide lamp | | | ○ | × | × | × | ○ | × | × | × |
| | | | mercury lamp | | | ○ | × | × | × | ○ | × | × | × |

| Classification | | | Chemical name | Weight-average molecular weight | (Meth)acrylate equivalent weight | Comparative Example | | | | | | | |
|---|---|---|---|---|---|---|---|---|---|---|---|---|---|
| | | | | | | 9 | 10 | 11 | 12 | 13 | 14 | 15 | 16 |
| (Meth)acrylate compound | tetrafunctional | EO-modified | A1 | 528 | 132 | | | | | | | | |
| | tetrafunctional | EO-modified | A2 | 534 | 134 | 44.9 | 44.9 | 44.9 | 44.9 | 44.9 | 44.9 | 44.9 | 44.9 |
| | tetrafunctional | EO-modified | A3 | 658 | 165 | | | | | | | | |
| | trifunctional | EO-modified | A4 | 560 | 187 | | | | | | | | |
| | trifunctional | EO-modified | A5 | 692 | 231 | 50.0 | | | | | | | |
| | hexafunctional | no modification | A6 | 535 | 107 | | 50.0 | | | | | | |
| | pentafunctional | no modification | A7 | 578 | 96 | | | 50.0 | | | | | |
| | tetrafunctional | PO-modified | A8 | 576 | 144 | | | | 50.0 | | | | |
| | trifunctional | EO-modified | A9 | 428 | 143 | | | | | 50.0 | | | |
| | trifunctional | PO-modified | A10 | 470 | 157 | | | | | | 50.0 | | |
| | tetrafunctional | no modification | A11 | 482 | 121 | | | | | | | 50.0 | |
| | trifunctional | no modification | A12 | 296 | 99 | | | | | | | | 50.0 |
| Photo-polymerization initiator | α-hydroxyalkylphenone compound | | b1 | 340 | | 5.0 | 5.0 | 5.0 | 5.0 | 5.0 | 5.0 | 5.0 | 5.0 |
| | | | b2 | 409 | | | | | | | | | |
| | | | b3 | 204 | | | | | | | | | |
| | α-aminoalkylphenone compound | | b4 | 279 | | | | | | | | | |
| | | | b5 | 367 | | | | | | | | | |
| | acylphosphine oxide compound | | b6 | 419 | | | | | | | | | |
| | | | b7 | 348 | | | | | | | | | |
| | thioxanthone compound | | b8 | 268 | | | | | | | | | |
| | benzophenone compound | | b9 | 182 | | | | | | | | | |
| Polymerization inhibitor | hydroquinone (hydroquinone) | | | — | | 0.1 | 0.1 | 0.1 | 0.1 | 0.1 | 0.1 | 0.1 | 0.1 |
| | Total | | | | | 100 | 100 | 100 | 100 | 100 | 100 | 100 | 100 |
| Curing rate | | | metal halide lamp | | | × | ○ | ○ | × | ○ | × | ○ | ○ |
| | | | mercury lamp | | | × | ○ | ○ | × | ○ | × | ○ | ○ |
| Low yellowing characteristics | | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |
| Cracking resistance | | | metal halide lamp | | | ○ | × | × | ○ | ○ | ○ | ○ | ○ |
| | | | mercury lamp | | | ○ | × | × | ○ | ○ | ○ | ○ | ○ |
| Low migration characteristics | | | metal halide lamp | | | ○ | ○ | ○ | ○ | × | × | × | × |
| | | | mercury lamp | | | ○ | ○ | ○ | ○ | × | × | × | × |
| Antistatic properties | | | metal halide lamp | | | ○ | × | × | × | ○ | × | × | × |
| | | | mercury lamp | | | ○ | × | × | × | ○ | × | × | × |

TABLE 6

| Classification | | | Chemical name | Weight-average molecular weight | (Meth)acrylate equivalent weight | Comparative Example | | | | | | | |
|---|---|---|---|---|---|---|---|---|---|---|---|---|---|
| | | | | | | 17 | 18 | 19 | 20 | 21 | 22 | 23 | 24 |
| (Meth)acrylate compound | tetrafunctional | EO-modified | A1 | 528 | 132 | | | | | | | | |
| | tetrafunctional | EO-modified | A2 | 534 | 134 | | | | | | | | |
| | tetrafunctional | EO-modified | A3 | 658 | 165 | 44.9 | 44.9 | 44.9 | 44.9 | 44.9 | 44.9 | 44.9 | 44.9 |
| | trifunctional | EO-modified | A4 | 560 | 187 | | | | | | | | |
| | trifunctional | EO-modified | A5 | 692 | 231 | 50.0 | | | | | | | |
| | hexafunctional | no modification | A6 | 535 | 107 | | 50.0 | | | | | | |
| | pentafunctional | no modification | A7 | 578 | 96 | | | 50.0 | | | | | |
| | tetrafunctional | PO-modified | A8 | 576 | 144 | | | | 50.0 | | | | |
| | trifunctional | EO-modified | A9 | 428 | 143 | | | | | 50.0 | | | |
| | trifunctional | PO-modified | A10 | 470 | 157 | | | | | | 50.0 | | |
| | tetrafunctional | no modification | A11 | 482 | 121 | | | | | | | 50.0 | |
| | trifunctional | no modification | A12 | 296 | 99 | | | | | | | | 50.0 |
| Photo-polymerization initiator | α-hydroxyalkylphenone compound | | b1 | 340 | | 5.0 | 5.0 | 5.0 | 5.0 | 5.0 | 5.0 | 5.0 | 5.0 |
| | | | b2 | 409 | | | | | | | | | |
| | | | b3 | 204 | | | | | | | | | |
| | α-aminoalkylphenone compound | | b4 | 279 | | | | | | | | | |
| | | | b5 | 367 | | | | | | | | | |
| | acylphosphine oxide compound | | b6 | 419 | | | | | | | | | |
| | | | b7 | 348 | | | | | | | | | |
| | thioxanthone compound | | b8 | 268 | | | | | | | | | |
| | benzophenone compound | | b9 | 182 | | | | | | | | | |
| Polymerization inhibitor | hydroquinone (hydroquinone) | | | — | | 0.1 | 0.1 | 0.1 | 0.1 | 0.1 | 0.1 | 0.1 | 0.1 |
| Total | | | | | | 100 | 100 | 100 | 100 | 100 | 100 | 100 | 100 |
| Curing rate | | | metal halide lamp | | | × | ○ | ○ | × | ○ | × | ○ | ○ |
| | | | mercury lamp | | | × | ○ | ○ | × | ○ | × | ○ | ○ |
| Low yellowing characteristics | | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |
| Cracking resistance | | | metal halide lamp | | | ○ | × | × | ○ | ○ | ○ | ○ | ○ |
| | | | mercury lamp | | | ○ | × | × | ○ | ○ | ○ | ○ | ○ |
| Low migration characteristics | | | metal halide lamp | | | ○ | ○ | ○ | ○ | × | × | × | × |
| | | | mercury lamp | | | ○ | ○ | ○ | ○ | × | × | × | × |
| Antistatic properties | | | metal halide lamp | | | ○ | × | × | × | ○ | × | × | × |
| | | | mercury lamp | | | ○ | × | × | × | ○ | × | × | × |

| Classification | | | Chemical name | Weight-average molecular weight | (Meth)acrylate equivalent weight | Comparative Example | | | | | | | |
|---|---|---|---|---|---|---|---|---|---|---|---|---|---|
| | | | | | | 25 | 26 | 27 | 28 | 29 | 30 | 31 | 32 |
| (Meth)acrylate compound | tetrafunctional | EO-modified | A1 | 528 | 132 | | | | | | | | |
| | tetrafunctional | EO-modified | A2 | 534 | 134 | | | | | | | | |
| | tetrafunctional | EO-modified | A3 | 658 | 165 | | | | | | | | |
| | trifunctional | EO-modified | A4 | 560 | 187 | 44.9 | 44.9 | 44.9 | 44.9 | 44.9 | 44.9 | 44.9 | 44.9 |
| | trifunctional | EO-modified | A5 | 692 | 231 | 50.0 | | | | | | | |
| | hexafunctional | no modification | A6 | 535 | 107 | | 50.0 | | | | | | |
| | pentafunctional | no modification | A7 | 578 | 96 | | | 50.0 | | | | | |
| | tetrafunctional | PO-modified | A8 | 576 | 144 | | | | 50.0 | | | | |
| | trifunctional | EO-modified | A9 | 428 | 143 | | | | | 50.0 | | | |
| | trifunctional | PO-modified | A10 | 470 | 157 | | | | | | 50.0 | | |
| | tetrafunctional | no modification | A11 | 482 | 121 | | | | | | | 50.0 | |
| | trifunctional | no modification | A12 | 296 | 99 | | | | | | | | 50.0 |
| Photo-polymerization initiator | α-hydroxyalkylphenone compound | | b1 | 340 | | 5.0 | 5.0 | 5.0 | 5.0 | 5.0 | 5.0 | 5.0 | 5.0 |
| | | | b2 | 409 | | | | | | | | | |
| | | | b3 | 204 | | | | | | | | | |
| | α-aminoalkylphenone compound | | b4 | 279 | | | | | | | | | |
| | | | b5 | 367 | | | | | | | | | |
| | acylphosphine oxide compound | | b6 | 419 | | | | | | | | | |
| | | | b7 | 348 | | | | | | | | | |
| | thioxanthone compound | | b8 | 268 | | | | | | | | | |
| | benzophenone compound | | b9 | 182 | | | | | | | | | |
| Polymerization inhibitor | hydroquinone (hydroquinone) | | | — | | 0.1 | 0.1 | 0.1 | 0.1 | 0.1 | 0.1 | 0.1 | 0.1 |
| Total | | | | | | 100 | 100 | 100 | 100 | 100 | 100 | 100 | 100 |
| Curing rate | | | metal halide lamp | | | × | ○ | ○ | × | ○ | × | ○ | ○ |
| | | | mercury lamp | | | × | ○ | ○ | × | ○ | × | ○ | ○ |
| Low yellowing characteristics | | | metal halide lamp | | | ○ | ○ | ○ | ○ | ○ | ○ | ○ | ○ |
| | | | mercury lamp | | | ○ | ○ | ○ | ○ | ○ | ○ | ○ | ○ |
| Cracking resistance | | | metal halide lamp | | | ○ | × | × | ○ | ○ | ○ | ○ | ○ |
| | | | mercury lamp | | | ○ | × | × | ○ | ○ | ○ | ○ | ○ |

TABLE 6-continued

| | | 
|---|---|
| Low migration characteristics | metal halide lamp | ○ ○ ○ ○ × × × × |
| | mercury lamp | ○ ○ ○ ○ × × × × |
| Antistatic properties | metal halide lamp | ○ × × × ○ × × × |
| | mercury lamp | ○ × × × ○ × × × |

TABLE 7

| Classification | | | Chemical name | Weight-average molecular weight | (Meth)acrylate equivalent weight | Comparative Example 33 | 34 | 35 | 36 | 37 | 38 | 39 |
|---|---|---|---|---|---|---|---|---|---|---|---|---|
| (Meth)acrylate compound | tetrafunctional | EO-modified | A1 | 528 | 132 | 94.9 | 94.9 | 94.9 | 94.9 | 83.9 | 83.9 | 83.9 |
| | tetrafunctional | EO-modified | A2 | 534 | 134 | | | | | | | |
| | tetrafunctional | EO-modified | A3 | 658 | 165 | | | | | | | |
| | trifunctional | EO-modified | A4 | 560 | 187 | | | | | | | |
| | trifunctional | EO-modified | A5 | 692 | 231 | | | | | | | |
| | hexafunctional | no modification | A6 | 535 | 107 | | | | | | | |
| | pentafunctional | no modification | A7 | 578 | 96 | | | | | | | |
| | tetrafunctional | PO-modified | A8 | 576 | 144 | | | | | | | |
| | trifunctional | EO-modified | A9 | 428 | 143 | | | | | | | |
| | trifunctional | PO-modified | A10 | 470 | 157 | | | | | | | |
| | tetrafunctional | no modification | A11 | 482 | 121 | | | | | | | |
| | trifunctional | no modification | A12 | 296 | 99 | | | | | | | |
| Photo-polymerization initiator | α-hydroxyalkylphenone compound | | b1 | 340 | | | | | | 16.0 | | |
| | | | b2 | 409 | | | | | | | 16.0 | |
| | | | b3 | 204 | | 5.0 | | | | | | 16.0 |
| | α-aminoalkylphenone compound | | b4 | 279 | | | 5.0 | | | | | |
| | | | b5 | 367 | | | | | | | | |
| | acylphosphine oxide compound | | b6 | 419 | | | | | | | | |
| | | | b7 | 348 | | | | | | | | |
| | thioxanthone compound | | b8 | 268 | | | | 5.0 | | | | |
| | benzophenone compound | | b9 | 182 | | | | | 5.0 | | | |
| Polymerization inhibitor | hydroquinone (hydroquinone) | | | — | | 0.1 | 0.1 | 0.1 | 0.1 | 0.1 | 0.1 | 0.1 |
| Total | | | | | | 100 | 100 | 100 | 100 | 100 | 100 | 100 |
| Curing rate | | | metal halide lamp | | | ○ | ○ | ○ | ○ | ○ | ○ | ○ |
| | | | mercury lamp | | | ○ | ○ | ○ | ○ | ○ | ○ | ○ |
| Low yellowing characteristics | | | metal halide lamp | | | ○ | Δ | × | ○ | ○ | ○ | ○ |
| | | | mercury lamp | | | ○ | Δ | × | ○ | ○ | ○ | ○ |
| Cracking resistance | | | metal halide lamp | | | ○ | ○ | ○ | ○ | ○ | ○ | ○ |
| | | | mercury lamp | | | ○ | ○ | ○ | ○ | ○ | ○ | ○ |
| Low migration characteristics | | | metal halide lamp | | | × | × | × | × | × | × | × |
| | | | mercury lamp | | | × | × | × | × | × | × | × |
| Antistatic properties | | | metal halide lamp | | | ○ | ○ | ○ | ○ | ○ | ○ | ○ |
| | | | mercury lamp | | | ○ | ○ | ○ | ○ | ○ | ○ | ○ |

| Classification | | | Chemical name | Weight-average molecular weight | (Meth)acrylate equivalent weight | Comparative Example 40 | 41 | 42 | 43 | 44 | 45 |
|---|---|---|---|---|---|---|---|---|---|---|---|
| (Meth)acrylate compound | tetrafunctional | EO-modified | A1 | 528 | 132 | 83.9 | 83.9 | 83.9 | 83.9 | 83.9 | 83.9 |
| | tetrafunctional | EO-modified | A2 | 534 | 134 | | | | | | |
| | tetrafunctional | EO-modified | A3 | 658 | 165 | | | | | | |
| | trifunctional | EO-modified | A4 | 560 | 187 | | | | | | |
| | trifunctional | EO-modified | A5 | 692 | 231 | | | | | | |
| | hexafunctional | no modification | A6 | 535 | 107 | | | | | | |
| | pentafunctional | no modification | A7 | 578 | 96 | | | | | | |
| | tetrafunctional | PO-modified | A8 | 576 | 144 | | | | | | |
| | trifunctional | EO-modified | A9 | 428 | 143 | | | | | | |
| | trifunctional | PO-modified | A10 | 470 | 157 | | | | | | |
| | tetrafunctional | no modification | A11 | 482 | 121 | | | | | | |
| | trifunctional | no modification | A12 | 296 | 99 | | | | | | |
| Photo-polymerization initiator | α-hydroxyalkylphenone compound | | b1 | 340 | | | | | | | |
| | | | b2 | 409 | | | | | | | |
| | | | b3 | 204 | | | | | | | |
| | α-aminoalkylphenone compound | | b4 | 279 | | 16.0 | | | | | |
| | | | b5 | 367 | | | 16.0 | | | | |
| | acylphosphine oxide compound | | b6 | 419 | | | | 16.0 | | | |
| | | | b7 | 348 | | | | | 16.0 | | |
| | thioxanthone compound | | b8 | 268 | | | | | | 16.0 | |
| | benzophenone compound | | b9 | 182 | | | | | | | 16.0 |

TABLE 7-continued

| | | | | | | | | |
|---|---|---|---|---|---|---|---|---|
| Polymerization inhibitor | hydroquinone (hydroquinone) | — | 0.1 | 0.1 | 0.1 | 0.1 | 0.1 | 0.1 |
| | Total | | 100 | 100 | 100 | 100 | 100 | 100 |
| | Curing rate | metal halide lamp | ○ | ○ | Δ | Δ | ○ | ○ |
| | | mercury lamp | ○ | ○ | Δ | Δ | ○ | ○ |
| | Low yellowing characteristics | metal halide lamp | Δ | Δ | ○ | ○ | × | ○ |
| | | mercury lamp | Δ | Δ | ○ | ○ | × | ○ |
| | Cracking resistance | metal halide lamp | ○ | ○ | ○ | ○ | ○ | ○ |
| | | mercury lamp | ○ | ○ | ○ | ○ | ○ | ○ |
| | Low migration characteristics | metal halide lamp | × | × | × | × | × | × |
| | | mercury lamp | × | × | × | × | × | × |
| | Antistatic properties | metal halide lamp | ○ | ○ | ○ | ○ | ○ | ○ |
| | | mercury lamp | ○ | ○ | ○ | ○ | ○ | ○ |

The invention claimed is:

1. An active energy ray-curable coating varnish for foodstuff and pharmaceutical packaging, comprising a (meth)acrylate compound (A) and a photopolymerization initiator (B), and having characteristic features (1) to (6) described below:
   (1) the (meth)acrylate compound (A) has three or more (meth)acrylic groups within a single molecule, and has a weight-average molecular weight within a range from 500 to 2,000,
   (2) the (meth)acrylate compound (A) comprises an ethylene oxide-modified (meth)acrylate compound (a) having a (meth)acrylic equivalent weight within a range from 120 to 200, and an amount of the ethylene oxide-modified (meth)acrylate compound (a) relative to a total weight of the (meth)acrylate compound (A) is at least 50% by weight,
   (3) the ethylene oxide-modified (meth)acrylate compound (a) comprises at least one compound selected from the group consisting of ethylene oxide-modified pentaerythritol tetraacrylates, ethylene oxide-modified diglycerol tetraacrylates, ethylene oxide-modified trimethylolpropane triacrylates, and ethylene oxide-modified ditrimethylolpropane tetraacrylates,
   (4) the photopolymerization initiator (B) has a weight-average molecular weight within a range from 300 to 2,000,
   (5) an amount of the photopolymerization initiator (B), relative to a total weight of the active energy ray-curable coating varnish, is within a range from 0.1 to 15.0% by weight, and
   (6) the photopolymerization initiator (B) comprises at least one of (b1) 2-hydroxy-1-[4-[4-(2-hydroxy-2-methyl-propionyl)-benzyl]-phenyl]-2-methylpropan-1-one, and (b2) oligo[2-hydroxy-2-methyl-1-[4-(1-methylvinyl)phenyl]propanone].

2. The active energy ray-curable coating varnish for foodstuff and pharmaceutical packaging according to claim 1, wherein relative to a total weight of the active energy ray-curable coating varnish, the active energy ray-curable coating varnish comprises at least one of 0.01 to 5.0% by weight of the compound (b1) and 0.01 to 5.0% by weight of the compound (b2), and a total weight of the photopolymerization initiator (B) is within a range from 1.0 to 15.0% by weight.

3. The active energy ray-curable coating varnish for foodstuff and pharmaceutical packaging according to claim 1, wherein concentrations of the (meth)acrylate compound (A) and the photopolymerization initiator (B) in ethanol, measured in accordance with (i) to (iv) described below, are each less than 100 ppb:
   (i) the active energy ray-curable coating varnish is printed onto a 100 cm$^2$ substrate at 0.0003 g/cm$^2$ to form a printed layer,
   (ii) using a metal halide lamp irradiation device, the printed layer is irradiated with ultraviolet rays under conditions including an irradiation output of 160 W/cm, an irradiation distance of 10 mm and a conveyor speed of 80 m/minute to cure the printed layer,
   (iii) a polypropylene film with a thickness of 0.2 mm having the same surface area as the printed layer is overlaid on the printed layer, and is left to stand for 10 days in an environment at 25° C. and 50% humidity while applying a load of 0.02 kg/cm$^2$, and
   (iv) the polypropylene film is removed and immersed for 10 days in 100 ml of ethanol in an environment at 60° C. and 50% humidity, and concentrations of the (meth)acrylate compound (A) and the photopolymerization initiator (B) in the ethanol are then measured.

4. A printed item for foodstuff and pharmaceutical packaging, having a printing layer formed from the active energy ray-curable coating varnish according to claim 1 on a substrate.

* * * * *